(12) United States Patent
Nakanishi et al.

(10) Patent No.: US 8,735,007 B2
(45) Date of Patent: May 27, 2014

(54) FUEL CELL SYSTEM AND OPERATION METHOD THEREFOR

(75) Inventors: Haruyuki Nakanishi, Susono (JP); Yusuke Kuzushima, Kyoto (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 1171 days.

(21) Appl. No.: 12/451,603

(22) PCT Filed: May 21, 2008

(86) PCT No.: PCT/IB2008/001265
§ 371 (c)(1),
(2), (4) Date: Nov. 20, 2009

(87) PCT Pub. No.: WO2008/146118
PCT Pub. Date: Dec. 4, 2008

(65) Prior Publication Data
US 2010/0119893 A1 May 13, 2010

(30) Foreign Application Priority Data
May 25, 2007 (JP) .................................. 2007-139443

(51) Int. Cl.
*H01M 8/06* (2006.01)
(52) U.S. Cl.
USPC ........................... 429/408; 429/414; 429/415
(58) Field of Classification Search
None
See application file for complete search history.

(56) References Cited

U.S. PATENT DOCUMENTS

| | | | | |
|---|---|---|---|---|
| 5,360,679 A | * | 11/1994 | Buswell et al. | 429/414 |
| 6,921,597 B2 | * | 7/2005 | Keefer et al. | 429/415 |
| 2002/0039648 A1 | | 4/2002 | Horpel et al. | |
| 2003/0190519 A1 | | 10/2003 | Kordesch et al. | |
| 2004/0137312 A1 | * | 7/2004 | Edlund | 429/46 |
| 2007/0190379 A1 | * | 8/2007 | Song et al. | 429/24 |
| 2009/0325012 A1 | * | 12/2009 | Nor | 429/23 |

FOREIGN PATENT DOCUMENTS

| | | |
|---|---|---|
| CN | 2645248 Y | 9/2004 |
| DE | 41 32 536 A1 | 4/1993 |

(Continued)

OTHER PUBLICATIONS

Jul. 24, 2012 Office Action issued in Japanese Patent Application No. 2007-139443 (with partial translation).

(Continued)

*Primary Examiner* — Barbara Gilliam
*Assistant Examiner* — Adam A Arciero
(74) *Attorney, Agent, or Firm* — Oliff PLC (57) ABSTRACT

An alkaline fuel cell having an electrolyte, and anode and cathode electrodes disposed on two sides of the electrolyte is provided. A fuel cell system has this fuel cell, a discharge passageway that is connected to a discharge opening of the fuel cell and that discharges from the fuel cell an exhaust fuel containing unreacted fuel, and a circulation passageway that is connected to an introduction opening for introducing the fuel into the fuel cell and that circulates and supplies the exhaust fuel to the fuel cell. The fuel cell system further includes fuel/water separation means linked to the discharge passageway and the circulation passageway and disposed between the discharge and circulation passageways. The means separates and removes water from the exhaust fuel flowing in from the discharge passageway, and then causes a concentrated fuel from which water has been separated and removed to flow into the circulation passageway.

6 Claims, 4 Drawing Sheets

(56) References Cited

FOREIGN PATENT DOCUMENTS

| | | |
|---|---|---|
| FR | 1 421 124 A | 12/1965 |
| JP | B-48-036050 | 11/1973 |
| JP | A-61-233973 | 10/1986 |
| JP | A-5-140775 | 6/1993 |
| JP | A-5-186545 | 7/1993 |
| JP | A-7-206745 | 8/1995 |
| JP | A-2000-169107 | 6/2000 |
| JP | A-2002-8706 | 1/2002 |
| JP | A-2003-515894 | 5/2003 |
| JP | A- 2004-55378 | 2/2004 |
| JP | A-2005-25959 | 1/2005 |
| JP | A-2005-87890 | 4/2005 |
| JP | A-2005-108849 | 4/2005 |
| JP | A-2006-236776 | 9/2006 |
| JP | A-2008-34138 | 2/2008 |
| WO | WO 01/39307 A2 | 5/2001 |
| WO | WO 2007/020819 A1 | 2/2007 |

OTHER PUBLICATIONS

International Search Report for International Application No. PCT/IB2008/001265, issued Sep. 1, 2008.
Written Opinion of the International Searching Authority for International Application No. PCT/IB2008/001265, issued Sep. 1, 2008.
Chinese Office Action issued in Chinese Patent Application No. 200880017327.2 on Jan. 4, 2012 (with translation).

\* cited by examiner

FUEL CELL SYSTEM AND OPERATION METHOD THEREFOR

FIELD OF THE INVENTION

The invention relates to a fuel cell system and an operation method for the fuel cell system. More concretely, the invention relates to a fuel cell system that has an alkaline fuel cell and uses the fuel by circulating the fuel.

BACKGROUND OF THE INVENTION

There are various types of fuel cells, for example, the alkaline type, the phosphoric acid type, the molten carbonate type, the solid electrolyte type, the solid polymer type, etc. Among such fuel cells, the alkaline fuel cell is generally constructed of an anode electrode, a cathode electrode, and an electrolyte solution that separates the two electrodes from each other. The anode electrode is supplied with hydrogen as a fuel (or with a fuel that is used as a material for producing hydrogen), and the cathode electrode is supplied with oxygen (or atmospheric air or the like). At the anode electrode, the hydrogen supplied thereto becomes hydrogen atoms, which react with hydroxide ions that reach the anode electrode from the cathode electrode by permeating through the electrolyte solution, so that water is produced. The electrons generated by this reaction are sent to an external electrode. At the cathode electrode, on the other hand, as the electrons extracted at the anode electrode are supplied via an external circuit, oxygen molecules adsorbed in the cathode electrode receive the electrons, and react with water of the electrolyte solution to produce hydroxide ions.

For example, in conjunction with an alkaline fuel cell disclosed in Japanese Patent Application Publication No. 2002-8706. (JP-A-2002-8706), a system for supplying hydrogen to the anode electrode is disclosed in which a reaction chamber is provided on the anode electrode side and pure hydrogen is generated. The interior of the reaction chamber is filled with a potassium hydroxide aqueous solution. During the operation of the fuel cell, silicon is supplied into the reaction chamber, in which silicon and potassium hydroxide react to produce pure hydrogen. The hydrogen thus produced is supplied to the anode electrode, so that the above-described electrochemical reaction occurs.

In some cases, for effective utilization of fuel, the fuel supplied to the anode electrode is used by circulating it. However, in the alkaline fuel cell, hydrogen and oxygen react at the anode electrode to produce water. Therefore, in the case where the anode electrode is supplied with a water-soluble fuel by circulation, fuel and water sometimes mix and the concentration of the fuel gradually declines. However, it is preferable that the fuel at a certain level of concentration be supplied in order to maintain high performance in power generation.

To this end, for example, a method in which the fuel concentration is detected, and at the time point when the detected fuel concentration declines to a certain level, the fuel is discharged and new fuel is supplied is conceivable. However, in some cases, the exhaust fuel contains unreacted fuel. From the viewpoint of effective utilization of fuel, it is preferable that such a wasteful discharge of fuel be restrained.

DISCLOSURE OF THE INVENTION

This invention provides an alkaline fuel cell that uses the fuel by circulating it and that is bettered so as to improve the effective utilization rate of fuel while restraining the decline in fuel concentration.

A first aspect of the invention relates to a fuel cell system that includes: an alkaline fuel cell having an electrolyte, and an anode electrode to which a liquid fuel is supplied and a cathode electrode that are disposed on two sides of the electrolyte; a discharge passageway that is connected to a discharge opening of the fuel cell and that discharges from the fuel cell an exhaust fuel that contains an unreacted fuel and the like; a circulation passageway that is connected to an introduction opening for introducing the fuel into the fuel cell and that circulates and supplies the exhaust fuel to the fuel cell; and fuel/water separation means linked to the discharge passageway and the circulation passageway and disposed between the discharge passageway and the circulation passageway. The fuel/water separation means separates and removes water from the exhaust fuel that flows in from the discharge passageway, and causes a concentrated fuel from which water has been separated and removed to flow into the circulation passageway.

The fuel cell system includes the fuel/water separation means that separates and removes water from the exhaust fuel that flows in from the discharge passageway, and that causes the concentrated fuel from which water has been separated and removed to flow into the circulation passageway. Therefore, in the alkaline fuel cell, the fuel can be used by circulating it while the decline of the fuel concentration due to mixing of the product water is restrained. Therefore, while effective use of the fuel is pursued, high performance in power generation can be maintained by supplying a relatively high concentration fuel to the fuel cell.

In the foregoing fuel cell system, the fuel/water separation means may include a recirculation portion that connects to the discharge passageway, and a fuel condensation portion which contacts the recirculation portion, and whose boundary with the recirculation portion is defined by a pervaporation membrane that selectively allows the fuel in the exhaust fuel to permeate through the pervaporation member, and into which the concentrated fuel having permeated through the pervaporation membrane is introduced, and which is connected to the circulation passageway so as to supply the concentrated fuel to the circulation passageway.

Since the above-described fuel/water separation means causes the exhaust fuel introduced into the recirculation portion to permeate through the pervaporation membrane, the fuel can be recovered at high concentration. Therefore, the concentrated fuel recovered to the fuel condensation portion can be supplied to the circulation passageway of the fuel, so that the decline of the fuel concentration can be restrained even when the fuel is used by circulating it.

The fuel may be an alcohol, and the pervaporation membrane may be a membrane that contains at least one species selected from the group consisting of high-silica zeolite, silicon rubber, high-silica zeolite-blended silicon rubber, and trimethylsilylpropyne.

The fuel cell system may further include a recirculation pipe which is connected to an inlet opening and an outlet opening of the recirculation portion, and which recirculates the exhaust fuel discharged from the outlet opening of the recirculation portion to an inlet opening side of the recirculation portion.

With this construction, the exhaust fuel left in the recirculation pipe passes through the recirculation pipe and is supplied to the fuel/water separation means again, and passes through the fuel/water separation means. Therefore, the fuel in the exhaust fuel left un-recovered at the time of one process of the passage through the fuel/water separation means can be eventually recovered, so that the fuel can be more effectively utilized.

In the foregoing fuel cell system, the fuel/water separation means may include a fuel condensation portion that communicates with the discharge passageway and with the circulation passageway, and a water introduction portion which contacts the fuel condensation portion, and whose boundary with the fuel condensation portion is defined by a pervaporation membrane that selectively allows water in the exhaust fuel to permeate through the pervaporation membrane, and into which the water permeating through the pervaporation membrane from the exhaust fuel is introduced.

If the fuel/water separation means has a water introduction portion whose boundary with the fuel condensation portion is defined by a pervaporation membrane that selectively allows water in the exhaust fuel to permeate the membrane, the water in the exhaust fuel introduced into the fuel condensation portion can be selectively removed by the permeation through the pervaporation membrane. Therefore, the fuel concentration in the exhaust fuel introduced into the fuel condensation portion can be heightened, so that the decline of the fuel concentration can be restrained even when the fuel is used by circulating it.

The fuel/water separation means may include a recirculation portion which is connected to the discharge passageway and into which the exhaust fuel flows, and heating means for selectively evaporating fuel from the exhaust fuel in the recirculation portion, and a fuel condensation portion which is connected between the recirculation portion and the circulation passageway, and into which the fuel evaporated in the recirculation portion is introduced, and which condenses the fuel and supplies the fuel to the circulation passageway.

With this construction, the fuel/water separation means can selectively evaporate the fuel in the exhaust fuel by using the heating means within the recirculation portion into which the exhaust fuel is introduced. Besides, the evaporated fuel is recovered to the fuel condensation portion, and is supplied again to the fuel cell via the circulation passageway. Hence, even when the fuel is used by circulating it, the decline of the fuel concentration can be restrained.

A second aspect of the invention relates to an operation method for a fuel cell system. In this operation method, when the fuel cell system is operated, the exhaust fuel having passed through the fuel/water separation means is supplied to the alkaline fuel cell by circulating the exhaust fuel.

A third aspect of the invention relates to an operation method for a fuel cell system. This method includes the step of separating a fuel from an exhaust fuel discharged from an alkaline fuel cell in a fuel circulation passageway, and the step of supplying the separated fuel to the alkaline fuel cell.

In this operation method, the fuel cell system is operated so that the exhaust fuel having passed through the fuel/water separation means is re-circulated to the fuel cell. Therefore, while the effective use of the fuel is pursued, the decline of the fuel concentration can be restrained so that the fuel cell can be operated.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

Hereinafter, embodiments of the invention will be described with reference to the drawings. The same or corresponding portions in the drawings are assigned with the same reference numerals, and the description thereof will be simplified or omitted.

Overall Construction of Fuel Cell System of First Embodiment

Figure 1:
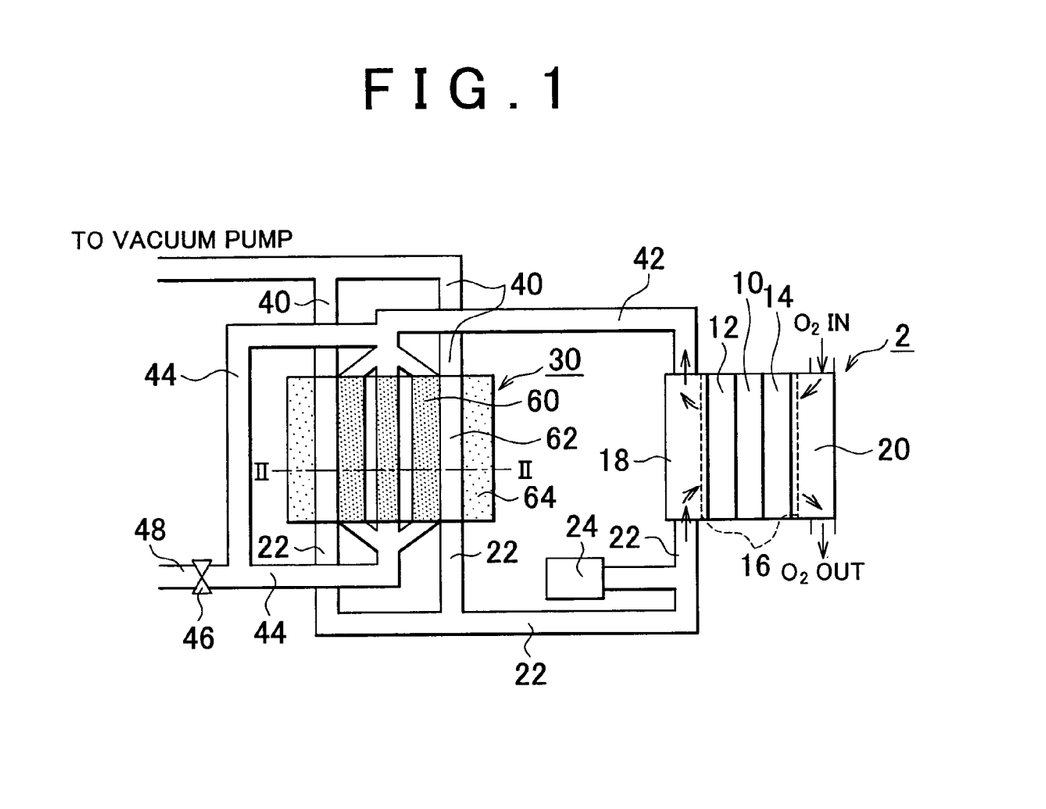
FIG. 1 is a schematic diagram for describing a fuel cell system in a first embodiment of the invention.

FIG. 1 is a schematic diagram for describing a construction of a fuel cell system of an embodiment of the invention. The system shown in FIG. 1 includes an alkaline fuel cell 2. The fuel cell 2 has an anion exchange membrane 10 (electrolyte). On two opposite sides of the anion exchange membrane 10, an anode electrode 12 and a cathode electrode 14 are disposed. A current collecting plate 16 is disposed on an outer side of each of the anode electrode 12 and the cathode electrode 14.

A fuel passageway 18 is connected to the current collecting plate 16 on the anode electrode 12 side. The fuel (ethanol in the first embodiment) supplied to the fuel cell 2 is supplied to the anode electrode 12 via the fuel passageway 18 and the current collecting plate 16. The water produced by the electrochemical reaction, unreacted fuel, etc. (hereinafter, referred to as "exhaust fuel") are discharged from the anode electrode 12 to the fuel passageway 18 side. On the other hand, an oxygen passageway 20 is connected to the current collecting plate 16 on the cathode electrode 14 side. Atmospheric air is supplied from the oxygen passageway 20 to the cathode electrode 14 via the current collecting plate 16, and an atmospheric air off-gas containing unreacted oxygen is discharged from the cathode electrode 14 to the oxygen passageway 20 side.

At a fuel injection opening (not shown) of the fuel cell 2, the fuel passageway 18 of the fuel cell 2 connects to a fuel supply pipe 22 (circulation passageway). The fuel supply pipe 22 at a side remote from the connecting portion of the pipe 22 to the fuel cell 2 branches into a pipe connecting to a fuel tank 24 that supplies ethanol as a fuel and a pipe connecting to a separator device 30 (fuel/water separation means) that has a structure described below. In addition, the fuel supply pipe 22 branches into a plurality of pipes that are connected to the separator device 30. The fuel supply pipe 22 is connected via an interior of the separator device 30 so as to communicate with a vacuum pump (not shown) through a piping 40 downstream of the separator device 30.

On the other hand, at a fuel discharge opening (not shown) of the fuel cell 2, the fuel passageway 18 of the fuel cell 2 connects to a fuel discharge pipe 42 (discharge passageway). An exhaust fuel discharged from the anode electrode 12 of the fuel cell 2 is discharged into the fuel discharge pipe 42. The fuel discharge pipe 42 at a side remote from the side connecting to the fuel cell 2 branches into a plurality of pipes that connect to the separator device 30. The fuel discharge pipe 42 is connected via an interior of the separator device 30 so as to communicate with the recirculation pipe 44 that is connected to the separator device 30. An end portion of the recirculation pipe 44 at a side remote from the connecting portion thereof to the separator device 30 joins the fuel discharge pipe 42 upstream of the connecting portion between the fuel discharge pipe 42 and the separator device 30. A circulation system is constructed of the recirculation portion 60, a portion of the recirculation pipe 44 between a portion thereof connected to the recirculation portion 60 and a portion thereof connected to the fuel discharge pipe 42, and a portion of the fuel discharge, pipe 42 between a portion thereof connected to the recirculation pipe 44 and a portion thereof connected to the recirculation portion 60. Incidentally, the portion of the fuel discharge pipe 42 between the portion thereof connected to the recirculation pipe 44 and the portion thereof connected to the recirculation portion 60 can also be regarded as a portion of the recirculation pipe 44. Besides, the recirculation pipe 44 also branches from the circulation system, and connects to a discharge pipe 48 via a valve 46.

Figure 2:
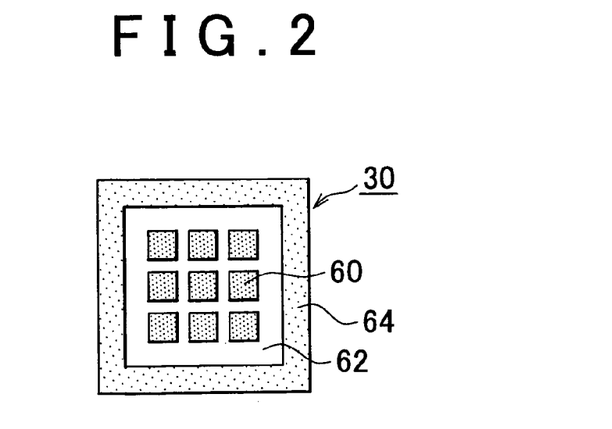
FIG. 2 is a schematic diagram for describing the fuel cell system in the first embodiment of the invention.

FIG. 2 is a schematic diagram for describing the separator device 30 that is mounted in the fuel cell system in accordance with the first embodiment of the invention. FIG. 2 shows a cross-section taken on a line in FIG. 1. Referring to FIGS. 1 and 2, the separator device 30 has a plurality of recirculation portions 60. Each of the recirculation portions 60 is connected at two ends thereof to the fuel discharge pipe 42 and the recirculation pipe 44 that are connected to outside portions of the separator device 30.

An outside peripheral wall of the recirculation portion 60 is formed by a pervaporation membrane. The pervaporation membrane is a uniform membrane having no pores which selectively allow ethanol in the exhaust fuel to permeate through the membrane. Around the recirculation portion 60, a fuel condensation portion 62 is formed which is separated from the boundary with the recirculation portion 60, by the pervaporation membrane. The fuel condensation portion 62 is connected at one side so as to communicate with the fuel supply pipe 22, and connects at another end portion to the piping 40, and thereby connects to communicate with the vacuum pump. A cooling portion 64 in which cooling water flows is disposed outside the fuel condensation portion 62.

Operation of Fuel Cell System of First Embodiment

When the fuel cell 2 is operated, a liquid fuel containing hydrogen, such as alcohol or the like, is supplied as a fuel to the anode electrode 12. Concretely, in the fuel cell system of the first embodiment, ethanol is used as a fuel. When the fuel is supplied to the anode electrode 12, hydrogen atoms are extracted from ethanol due to the catalytic action of the anode electrode 12, and the hydrogen atoms and the hydroxide ions having passed through the anion exchange membrane 10 react to produce water and, at the same time, release electrons. The reaction at the anode electrode 12 proceeds as in the following equation (1) in the case where the fuel is pure hydrogen or the following equation (2) in the case where the fuel is ethanol.

$$H_2 + 2OH^- \rightarrow 2H_2O + 2e^- \tag{1}$$

$$CH_3CH_2OH + 12OH^- \rightarrow 2CO_2 + 9H_2O + 12e^- \tag{2}$$

On the other hand, the cathode electrode 14 is supplied with the atmospheric air (or oxygen). As the atmospheric air is supplied to the cathode electrode 14, oxygen molecules in the atmospheric air receive electrons from the cathode electrode 14 to produce hydroxide ions through several stages due to the catalytic action of the cathode electrode 14. The hydroxide ions move to the anode electrode 12 side through the anion exchange membrane 10. The reaction at the cathode electrode 14 proceeds as in the following equation (3):

$$\tfrac{1}{2}O_2 + H_2O + 2e^- \rightarrow 2OH^- \tag{3}$$

The combination of the reactions at the anode electrode 12 side and the cathode electrode 14 side described above shows that the water-producing reaction represented by the following equation (4) occurs in the fuel cell as a whole, and the electrons involved in the reaction move via the current collecting plate 16 on the two electrode sides. Therefore, current flows, that is, electric power is generated.

$$H_2 + \tfrac{1}{2}O_2 \rightarrow H_2O \tag{4}$$

As shown in the equation (1) or (2), water is produced at the anode electrode 12 side in the electrochemical reaction of this alkaline fuel cell. Therefore, in the case where a water-soluble fuel, such as ethanol, is used by circulating it, it is conceivable that as the operation time of the fuel cell 2 lengthens, the amount of the product water mixing into the fuel increases and the fuel concentration gradually lowers.

In the fuel cell system of the first embodiment, however, the water mixed in the ethanol is separated and removed by the separator device 30 disposed in an intermediate portion of the circulation passageway of ethanol (the fuel supply pipe 22, the fuel discharge pipe 42, etc.). The operation of the separator device 30 in the fuel cell system will be described below.

The exhaust fuel discharged from the fuel passageway 18 of the fuel cell 2 into the fuel discharge pipe 42 passes through the fuel discharge pipe 42, and flows into the recirculation portion 60 in the separator device 30. It is to be noted herein that in the fuel condensation portion 62 disposed outside the recirculation portion 60, the pressure has been reduced by the vacuum pump. Besides, the boundary surface between the recirculation portion 60 and the fuel condensation portion 62 is formed by a pervaporation membrane. The pervaporation membrane has a property of selectively allowing the permeation therethrough of only ethanol in the exhaust fuel that contains ethanol and water. Therefore, the pressure difference between the recirculation portion 60 and the fuel condensation portion 62 becomes a driving force such that only the ethanol in the exhaust fuel supplied to the recirculation portion 60 passes through the pervaporation membrane to the fuel condensation portion 62. On the other hand, the water in the exhaust fuel cannot pass through the pervaporation membrane, and therefore is left within the recirculation portion 60.

In this manner, the ethanol is concentrated due to the permeation through the pervaporation membrane from the exhaust fuel in the recirculation portion 60, and is recovered in the fuel condensation portion 62. Then, the ethanol is cooled and liquefied by the cooling portion 64 disposed on the outer periphery. After that, the ethanol is discharged from the fuel condensation portion 62 of the separator device 30 into the fuel supply pipe 22. The ethanol is supplied as a fuel from the fuel supply pipe 22 to the fuel cell 2 again.

Besides, in the case where the amount of flow of ethanol supplied from the fuel supply pipe 22 is short, only the amount of shortage is additionally supplied from a fuel supply source 24. Thus, the interior of the fuel cell 2 is constantly supplied with a necessary amount of fuel at a predetermined pressure.

On the other hand, the exhaust fuel containing water that does not permeate through the pervaporation membrane but remains in the recirculation portion 60 is discharged into the recirculation pipe 44 connected to the separator device 30. The exhaust fuel discharged into the recirculation pipe 44 enters the fuel discharge pipe 42 upstream of the separator device 30, and mixes with the exhaust fuel that is flowing in the fuel discharge pipe 42 from the fuel cell 2, and thus flows into the separator device 30 again.

In this fuel cell system, the ethanol concentration in the exhaust fuel discharged from the separator device 30 into the recirculation pipe 44 is detected. In the case where the ethanol concentration is dilute below a reference value, the valve 46 is opened to discharge the exhaust fuel of the low ethanol concentration from the discharge pipe 48 to the outside.

As described above, according to the fuel cell system of the first embodiment, while the effective use of the fuel is pursued by circulating the exhaust fuel, ethanol can selectively be recovered from the circulating fuel, and can be put into the circulation. Therefore, the concentration of ethanol supplied to the fuel cell 2 can be kept high. Besides, due to the circulation of the exhaust fuel via the recirculation pipe 44, the exhaust fuel repeatedly passes through the interior of the separator device 30. Therefore, even if one process of the separation cannot achieve thorough recovery of ethanol but some ethanol remains in the exhaust fuel in the recirculation portion 60, the ethanol in the exhaust fuel can be recovered when the exhaust fuel passes through the interior of the separator device 30 again. Therefore, ethanol can be more effectively utilized. Besides, when it is detected that the ethanol concentration is at or below a reference value, the exhaust fuel is discharged to the outside. This restrains excessive decline of the ethanol concentration in the fuel that is used by circulating it.

The pervaporation membrane that separates ethanol and water as described is available in various kinds. Concretely, examples thereof include membranes of macromolecular materials such as high-silica zeolite (hydrophobic zeolite), silicon rubber, trimethylsilylpropyne, high-silica zeolite-contaminated silicon rubber, etc.

Figure 3:
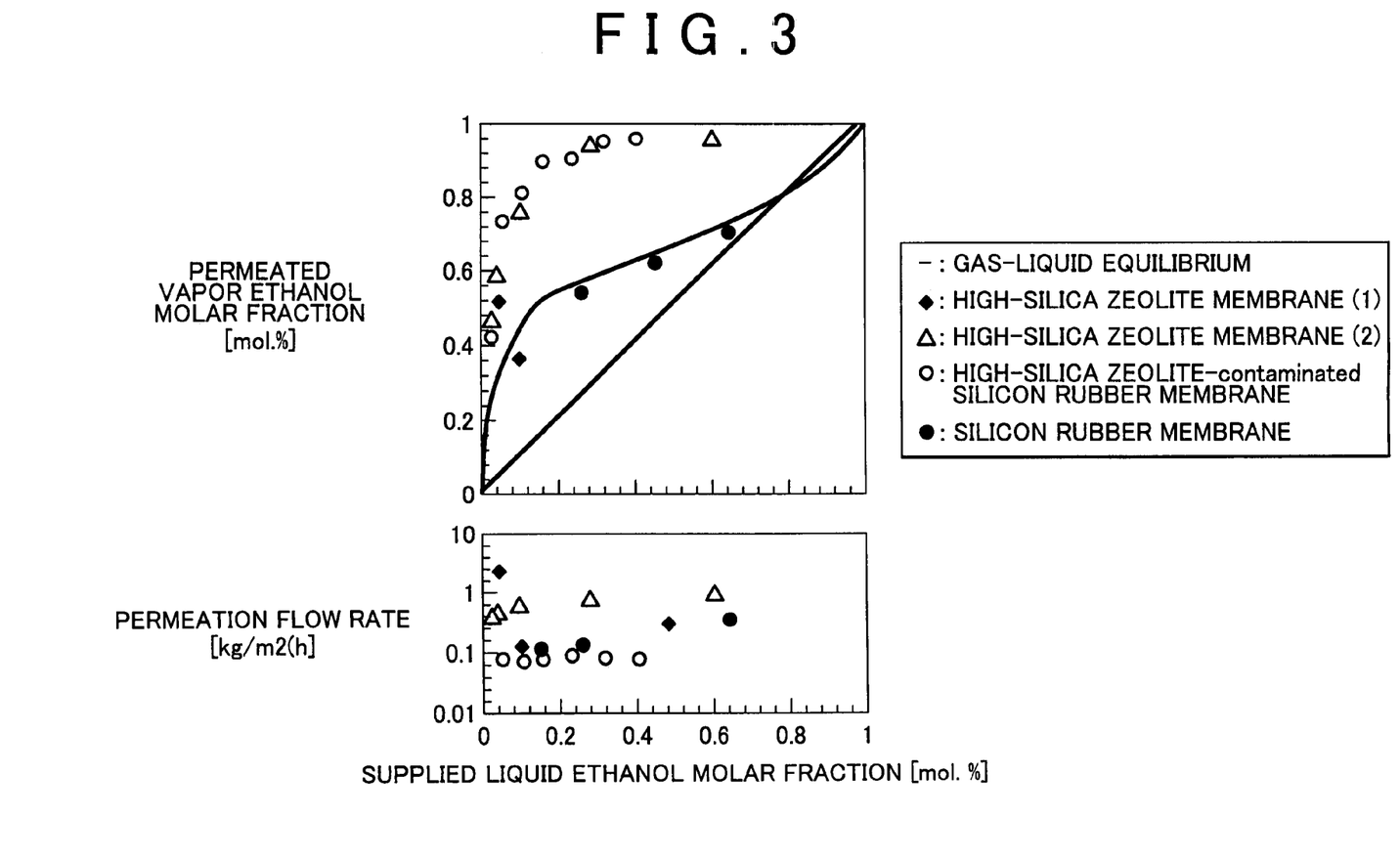
FIG. 3 is a diagram for describing characteristics of a membrane that can be used as a pervaporation membrane in a separator device in the first embodiment of the invention.

FIG. 3 is a diagram for describing characteristics of the pervaporation membrane. In FIG. 3, the horizontal axis shows the molar fraction [mol. %] of ethanol supplied to each membrane, and the vertical axis shows the permeation flow rate [kg/(m$^2$·h)] and the permeated vapor ethanol molar fraction [mol. %]. From FIG. 3, it can be understood that the use of the high-silica zeolite membrane (2) makes it possible to obtain a concentrated ethanol solution of 70 to 90 [mol. %] at a relatively fast permeation flow rate from a supplied low-ethanol concentration solution. Incidentally, a membrane, such as silicon rubber membrane or the like, that does not deliver such a high separation performance as the high-silica zeolite membrane (2) is able to remove water to some degree from the fuel. Therefore, even if a silicon rubber membrane or the like is used as the pervaporation membrane, the fuel can be concentrated for circulation, so that the effective utilization of the fuel can be pursued.

In the foregoing description of the system of the first embodiment, the separation between ethanol and water by the separator device 30 is always performed during operation of the fuel cell 2. However, the separation between ethanol and water may be performed only when the ethanol concentration in the exhaust fuel has declined. Concretely, for example, a bypass passageway bypassing the separator device 30 is provided, and the decline of the concentration of ethanol is detected by a concentration meter or a time counter. In this construction, if it is determined that the ethanol concentration is higher than a reference concentration, the exhaust fuel is caused to flow through the bypass passageway. If it is determined that the ethanol concentration has declined to or below the reference concentration, the exhaust fuel is caused to flow through the separator device 30.

Besides, in the foregoing description of the first embodiment, the ethanol concentration in the exhaust fuel is detected, and if the ethanol concentration is at or below the reference value, the exhaust fuel is discharged to the outside by releasing the valve 46. However, in this invention, the method of discharging the exhaust fuel by opening and closing the valve 46 and the method of circulating the exhaust fuel into the separator device 30 are not limited so. For example, a reference time for circulating the exhaust fuel within the separator device 30 may be set, and when the elapse of the reference time is recognized, the valve 46 may be released, so that the exhaust fuel with a lowered ethanol concentration will be discharged.

Besides, the shape and structure of the separator device 30 described with reference to FIGS. 1 and 2 are not limited to what have been described above. In this invention, as for the separation means for separating fuel and water, it suffices that the boundary surface between the fuel condensation portion 62 and the recirculation portion 60 where the recovery from the exhaust fuel occurs be formed of a pervaporation membrane, and the shapes, structures, or the like of portions of the separation means are not concerned in the invention. For efficient recovery of ethanol, it is preferable that the cooling portion 64 that cools the recovered ethanol be disposed. However, in the case where the cooling can be accomplished in a different portion, the disposal of the cooling portion 64 in the separator device 30 may be omitted.

Incidentally, in the foregoing description of the first embodiment, since ethanol is used as a fuel, the pervaporation method that employs a membrane that selectively allows ethanol to permeate therethrough is utilized at the boundary surface between the recirculation portion 60 and the fuel condensation portion 62 is used. However, this invention is not limited to the case where the fuel is ethanol. In this invention, even in the case where a fuel other than ethanol is used, the fuel can be separated from water, and can be recovered in a concentrated state, and can be circulated again for use. That is, it suffices that a pervaporation membrane for separating the recirculation portion 60 and the fuel condensation portion 62 be selected in accordance with the kind of the fuel. The pervaporation membranes in accordance with various fuels are known through various studies and the like, and therefore the detailed listing thereof is omitted herein. For example, in the case where NH$_3$ (ammonium water) is used as a fuel, a chitosan membrane can be used.

Figure 4:
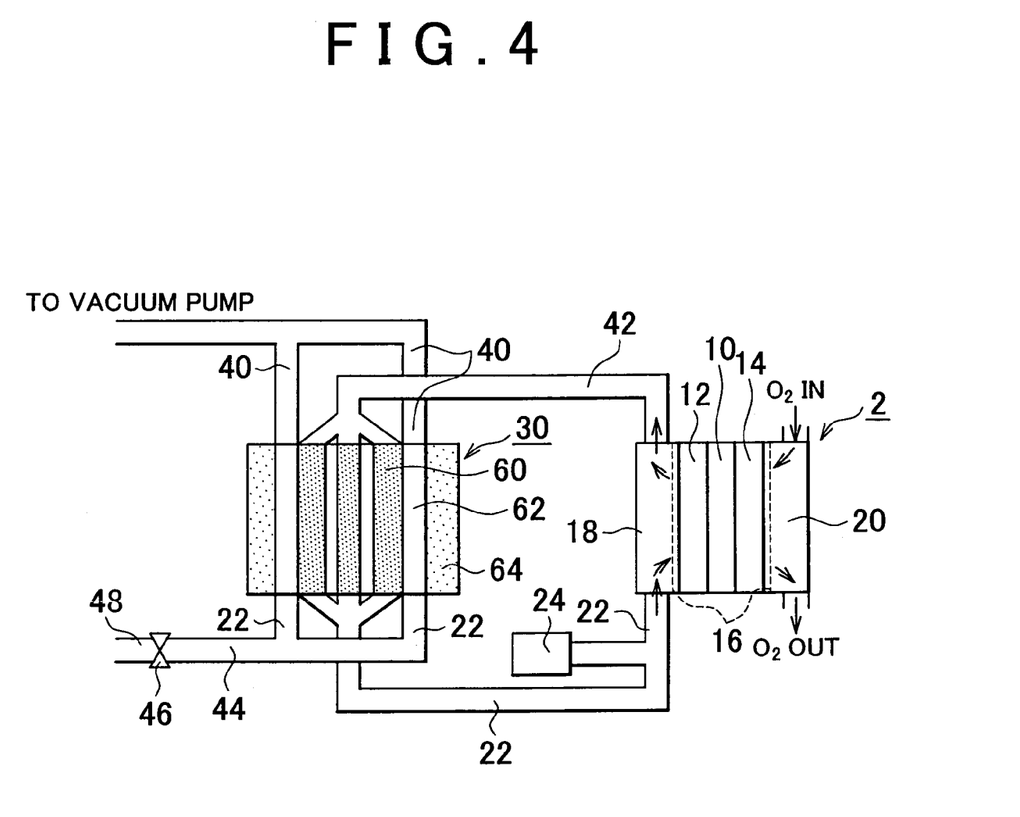
FIG. 4 is a schematic diagram for describing a fuel cell system in a modified embodiment of the first embodiment of the invention.

Besides, the invention is not limited to the case where the fuel is selectively recovered from the exhaust fuel by permeation through the pervaporation membrane. For example, a pervaporation membrane that selectively allows water to permeate therethrough can also be used at the boundary between the recirculation portion 60 and the fuel condensation portion 62. In the case where such a system is adopted, fuel is left within the recirculation portion 60 of the separator device 30. Therefore, this system can be realized by constructing a structure in which the fuel supply pipe 22 is connected to the recirculation portion 60, and the recirculation pipe 44 is connected to the fuel condensation portion 62 as shown in FIG. 4.

Besides, the embodiment has been described in conjunction with the case where an alkaline fuel cell employing the anion exchange membrane 10 is used as a fuel cell. However, this invention is not limited to this type of fuel cell. For example, it is also permissible to use an alkaline fuel cell employing an electrolyte that allows negative ions to pass through, such as KOH or the like, instead of the anion exchange membrane 10.

In FIG. 1, to simplify the illustration, only one anion exchange membrane 10 and one pair of electrodes (the anode electrode 12 and the cathode electrode 14) disposed on the opposite sides of the anion exchange membrane 10 are shown within the fuel cell 2. However, the fuel cell may have a stack structure in which a plurality of so-called membrane-electrode assemblies (MEAs) made up of an anion exchange membrane 10 and a pair of electrodes are stacked with separators disposed therebetween. Besides, a diffusion layer may also be disposed on the surface of a catalyst layer of each of the anode electrode 12 and the cathode electrode 14.

SECOND EMBODIMENT

Figure 5:
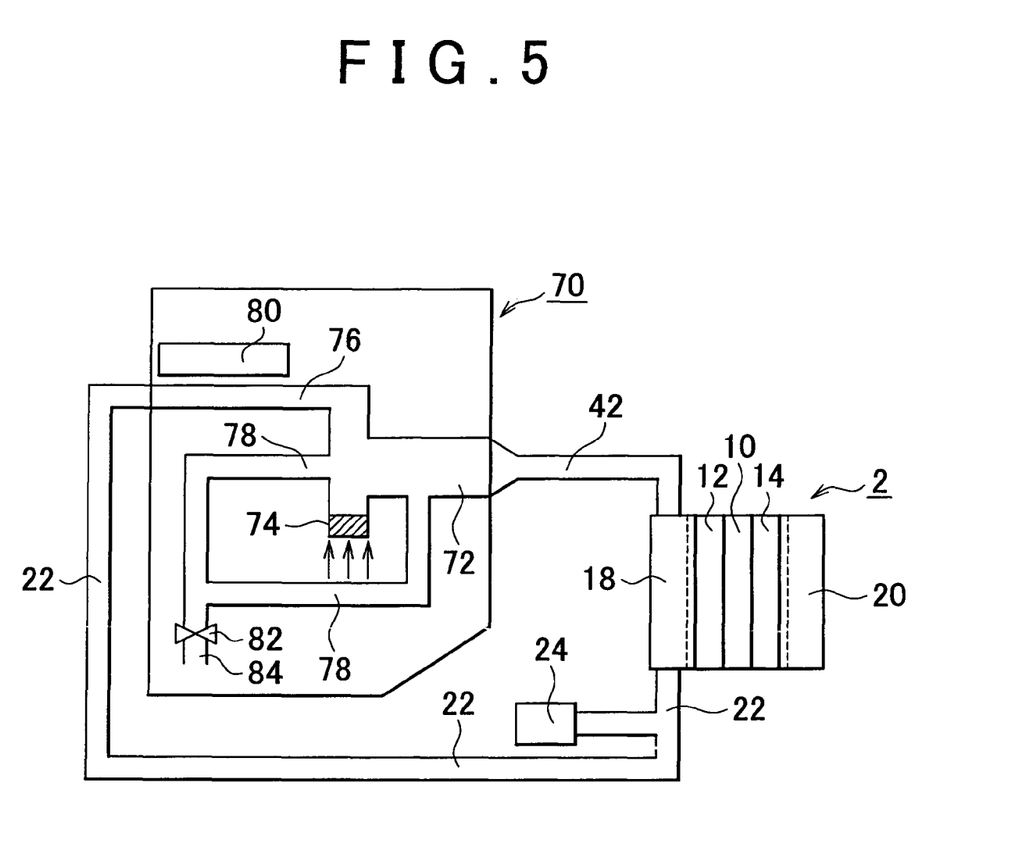
FIG. 5 is a schematic diagram for describing a fuel cell system in a second embodiment of the invention.

FIG. 5 is a schematic drawing for describing the structure of a fuel cell system of a second embodiment of this invention. The fuel cell system shown in FIG. 5 has substantially the same construction as the system shown in FIG. 1, except that the system for separation between ethanol and water is different.

In FIG. 5, a separation device 70 (fuel/water separation means) that separates ethanol and water is disposed between a fuel supply pipe 22 and a fuel discharge pipe 42. The ethanol/water separation device 70 has therein a separation portion 72 that connects to the fuel discharge pipe 42. Within the separation portion 72, a heating device 74 that heats the exhaust fuel introduced thereto is installed. A side portion located downstream of the site where the heating device 74 is installed branches into a fuel condensation portion 76 and a recirculation portion 78. A cooling device 80 is installed near the fuel condensation portion 76. The fuel condensation portion 76 connects to the fuel supply pipe 22 that is connected to the outside of the separation device 70. The recirculation portion 78, on the other hand, connects to the separation portion 72. Besides, the recirculation portion 78 branches from the circulation system of the exhaust fuel, and the branch connects to a discharge pipe 84 via a valve 82. The separation portion 72 and the recirculation portion 78 can be regarded as the recirculation portion of the present invention.

The exhaust fuel mainly contains water and ethanol. The boiling point of ethanol is about 78° C., which is lower than the boiling point of water. Utilizing this fact, the separation device 70 of the second embodiment distills the exhaust fuel to concentrate ethanol for circulation. Concretely, the exhaust fuel discharged from the fuel cell 2 flows from the fuel discharge pipe 42 into the separation portion 72, in which the exhaust fuel is heated by the heating device 74. Incidentally, the heating device 74 is set and controlled by an ECU (not shown) so as to heat the exhaust fuel within a temperature range that is higher than or equal to the boiling point of ethanol and is lower than the boiling point of water. Therefore, in the separation portion 72, ethanol in the exhaust fuel is mainly vaporized, so that mainly ethanol flows into the fuel condensation portion 76 provided above. The ethanol in the fuel condensation portion 76 is cooled to liquefy by the cooling device 80. After that, the concentrated ethanol passes through the fuel supply pipe 22 connected to the downstream side of the fuel condensation portion 76, and is supplied again to the fuel cell 2.

On the other hand, water is not heated to its boiling point, and therefore directly flows into the recirculation portion 78 disposed in the passage direction of the exhaust fuel, and flows therethrough to the upstream side of the separation portion 72 and enters the separation portion 72. In the case where during the circulation, the amount of water increases so that the fuel concentration in the separation portion 72 becomes below a reference value, the valve 82 is opened, so that the exhaust fuel is discharged out of the recirculation portion 78 via the discharge pipe 84.

In this manner, the separation device 70 of the second embodiment can also reliably separate ethanol and water from each other. Hence, ethanol can be used by circulating it while the decline of the ethanol concentration is restrained, so that the fuel can be effectively utilized.

Incidentally, the second embodiment is described above in conjunction with the case where ethanol is used as a fuel. However, this invention is not limited so; that is, fuels other than ethanol may also be used as the fuel in the invention. In such a case, it suffices that the distillation method be used and the heating temperature of the heating device 74 be set on the basis of the boiling point of the fuel. Besides, in the case where the boiling point of water is lower than the boiling point of the fuel, it suffices that a heating temperature that evaporates water but does not evaporate the fuel be set, and water be recovered into the fuel condensation portion 76 shown in FIG. 5, and be caused to circulate and flow into the separation device 70, and the fuel be recovered into the recirculation portion 78 shown in FIG. 5, and be supplied to the fuel supply pipe 22.

Incidentally, the separation device 70 is not limited to the structure described in conjunction with the second embodiment. That is, the concrete structure of the device may be any other structure as long as the structure is provided so as to employ a so-called distillation method that utilizes the different boiling points of water and the fuel.

Besides, as for the method of separating fuel and water, the pervaporation method is, described above in conjunction with the first embodiment, and the use of the simple distillation process is described above in conjunction with the second embodiment. However, the invention is not limited so. For example, a reverse osmosis process, a membrane distillation process, a vapor permeation process, etc. may be used to recover fuel from the exhaust fuel.

Incidentally, in the foregoing embodiments, although not shown in the drawings, valves and pumps are provided for the fuel supply pipe 22, the recirculation pipe 44, the recirculation portion 78, etc. so that the exhaust fuel is circulated to the fuel cell, the separator device 30 and the separation portion 72.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

The invention claimed is:

1. A fuel cell system comprising:
an alkaline fuel cell having an electrolyte, and an anode electrode and a cathode electrode that are disposed on two sides of the electrolyte;
a discharge passageway that is connected to a discharge opening of the fuel cell and that discharges from the fuel cell an exhaust fuel that contains an unreacted fuel;
a circulation passageway that is connected to an introduction opening for introducing the fuel into the fuel cell and that circulates and supplies the exhaust fuel to the fuel cell; and
a fuel/water separation device linked to the discharge passageway and the circulation passageway and disposed between the discharge passageway and the circulation passageway, the fuel/water separation device separating and removing water from the exhaust fuel that flows in from the discharge passageway, and causing a concentrated fuel from which water has been separated and removed to flow into the circulation passageway, wherein:

the fuel is a liquid, and the fuel/water separation device includes a recirculation portion that connects to the discharge passageway, and a fuel condensation portion which contacts the recirculation portion, and whose boundary with the recirculation portion is defined by a pervaporation membrane that selectively allows the fuel in the exhaust fuel to permeate through the pervaporation membrane, and into which the concentrated fuel having permeated through the pervaporation membrane is introduced, and which is connected to the circulation passageway so as to supply the concentrated fuel to the circulation passageway.

2. The fuel cell system according to claim 1, wherein the fuel is an alcohol, and the pervaporation membrane is a membrane that contains at least one species selected from the group consisting of high-silica zeolite, silicon rubber, high-silica zeolite-contaminated silicon rubber, and trimethylsilylpropyne.

3. The fuel cell system according to claim 1, further comprising a recirculation pipe an end of which is connected to an inlet opening of the recirculation portion, and another end of which is connected to an outlet opening of the recirculation portion, and which recirculates the exhaust fuel discharged from the outlet opening of the recirculation portion to an inlet opening side of the recirculation portion.

4. The fuel cell system according to claim 1, further comprising a vacuum pump that depressurizes the fuel condensation portion.

5. The fuel cell system according to claim 1, wherein the fuel condensation portion is a cooling portion that cools the concentrated fuel.

6. A fuel cell system comprising:

an alkaline fuel cell having an electrolyte, and an anode electrode and a cathode electrode that are disposed on two sides of the electrolyte;

a discharge passageway that is connected to a discharge opening of the fuel cell and that discharges from the fuel cell an exhaust fuel that contains an unreacted fuel;

a circulation passageway that is connected to an introduction opening for introducing the fuel into the fuel cell and that circulates and supplies the exhaust fuel to the fuel cell; and a fuel/water separation device linked to the discharge passageway and the circulation passageway and disposed between the discharge passageway and the circulation passageway, the fuel/water separation device separating and removing water from the exhaust fuel that flows in from the discharge passageway, and causing a concentrated fuel from which water has been separated and removed to flow into the circulation passageway, wherein:

the fuel is a liquid, and the fuel/water separation device includes a fuel condensation portion that communicates with the discharge passageway and with the circulation passageway, and a water introduction portion which contacts the fuel condensation portion, and whose boundary with the fuel condensation portion is defined by a pervaporation membrane that selectively allows water in the exhaust fuel to permeate through the pervaporation membrane, and into which the water permeating through the pervaporation membrane from the exhaust fuel is introduced.

* * * * *